United States Patent
Cunningham

(10) Patent No.: US 7,961,606 B2
(45) Date of Patent: *Jun. 14, 2011

(54) PACKET FLOW CONTROL IN SWITCHED FULL DUPLEX ETHERNET NETWORKS

(75) Inventor: James Brian Cunningham, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 103 days.

This patent is subject to a terminal disclaimer.

(21) Appl. No.: 12/194,239

(22) Filed: Aug. 19, 2008

(65) Prior Publication Data

US 2008/0304415 A1    Dec. 11, 2008

Related U.S. Application Data

(63) Continuation of application No. 11/006,126, filed on Dec. 7, 2004, now Pat. No. 7,436,773.

(51) Int. Cl.
*H04L 12/00* (2006.01)
(52) U.S. Cl. .................. 370/229; 370/236; 370/419
(58) Field of Classification Search .............. None
See application file for complete search history.

(56) References Cited

U.S. PATENT DOCUMENTS

| | | | | |
|---|---|---|---|---|
| 6,026,075 | A * | 2/2000 | Linville et al. | 370/236 |
| 6,170,022 | B1 * | 1/2001 | Linville et al. | 710/29 |
| 6,724,725 | B1 * | 4/2004 | Dreyer et al. | 370/231 |
| 6,754,179 | B1 * | 6/2004 | Lin | 370/235 |
| 6,851,008 | B2 * | 2/2005 | Hao | 710/305 |
| 6,882,622 | B1 * | 4/2005 | Donoghue | 370/229 |
| 7,436,773 | B2 * | 10/2008 | Cunningham | 370/236 |
| 2004/0095882 | A1 * | 5/2004 | Hamzah et al. | 370/229 |
| 2008/0002732 | A1 * | 1/2008 | Tzeng et al. | 370/412 |

FOREIGN PATENT DOCUMENTS

GB    2361139 A    10/2001

\* cited by examiner

*Primary Examiner* — Robert C Scheibel
(74) *Attorney, Agent, or Firm* — Dillon & Yudell LLP

(57) ABSTRACT

A method, system, and computer program product for controlling data packet traffic flow into a link partner device such as an ethernet adapter. In one embodiment, an occupancy level of an adapter receive queue is monitored to detect a receive queue overrun or underrun condition or event. The detected overrun or underrun condition or event is utilized as the criteria for adjusting a pause time value within a pause time flow control frame. The pause time flow control frame is transmitted from the link partner device to a corresponding remote link partner device to pause data packet transmission in accordance with the adjusted pause time value.

37 Claims, 4 Drawing Sheets

PACKET FLOW CONTROL IN SWITCHED FULL DUPLEX ETHERNET NETWORKS

PRIORITY CLAIM

The present application is a continuation of U.S. Pat. No. 7,436,773, titled "Packet Flow Control in Switched Full Duplex Ethernet Networks, filed on Dec. 7, 2004, the content of which is incorporated herein by reference in its entirety.

BACKGROUND OF THE INVENTION

1. Technical Field

The present invention relates generally to computer networking and, in particular, to improving link bandwidth utilization in a packet-switched network. More particularly, the present invention relates to a system, method, program product, and data structure for selectively adjusting pause time flow control in packet-switched networks. Still more particularly, the present invention relates to a pause time flow control technique having applicability in full-duplex Ethernet Local Area Network (LAN) systems conforming to the IEEE standard 802.3x.

2. Description of the Related Art

Network devices generally utilize a layered communication model such as the open systems interconnection (OSI) model developed by the International Organization for Standards (ISO) for providing structured processing of information. The OSI layered model is useful for separating the technological functions of each layer, and thereby facilitating the modification or update of a given layer without detrimentally impacting the functions of neighboring layers.

The OSI model defines layered processing that facilitates flexibly structured network communications functions relating to data transmission, inter-node routing, initiating, establishment and maintenance of a communication link between nodes, data transfer having a specified quality of service, etc. In accordance with established OSI convention, the lowermost layers comprise a media access control (MAC) layer and a physical layer. The physical layer encodes and decodes data into signals that are transmitted across a transmission medium, such as an electronic or fiber optic cable. The physical layer further includes an interface connector that is configured and operable to adaptively communicate across the transmission medium.

The most prominent protocol for controlling network traffic at the lower physical and MAC layers in local area networks (LANs) is known as Ethernet. Ethernet is packet-based and defines signal paths and signaling protocol for the physical layer, and packet formats and protocols for the MAC/data link layer of the OS model. Ethernet is primarily standardized as IEEE standard 802.3. Ethernet has become the most widespread LAN technology in use during the 1990's to the present, and has largely replaced all other LAN standards such as token ring, FDDI, and ARCNET.

Congestion occurs in Ethernet transmissions when the bandwidth of a given network link is exceeded, resulting in transmission errors, lost data and/or substantial delays in data transmission. Conventional flow control techniques for addressing congestion typically involve sensing traffic levels at one or more network nodes, strategically distributing control-type packets to notify potentially affected nodes of a detected congestion condition, and delaying data packet transmission to/from specified nodes in accordance with an underlying flow control algorithm.

Flow control in Ethernet systems may be implemented in one or more of a variety of possible techniques. For example, high traffic experienced by a particular port in an Ethernet adapter, switch, or similar receiving device may cause the receive queue associated with that port to reach a predetermined threshold "overrun" value. Conversely, a relative low traffic condition experienced over a period of time at the input port may result in the associated receive queue dropping to a pre-specified "underrun" threshold level. Convention Ethernet flow control includes control frame techniques for addressing both overrun and underrun conditions. Specifically, responsive to a detected overrun condition, the host device driver, or other receiving device, generally instructs the remote transmitting device to pause data transmissions such that data accumulated in the receive queue may drain to level such that an actual overrun condition (i.e. packets dropped due to input queue space unavailability) is prevented. In Ethernet/IEEE 802.3x-compliant systems, the recipient Ethernet adapter sends an "XOFF" pause MAC control frame to the transmitting device. The XOFF pause frame includes a pause time field specifying a pause time value over which the transmitting device is directed to desist data transmissions to the receiving adapter. If, as reflected by the receiving adapter packet receive queue, the overrun condition adequately eases (e.g. receive queue falls below a pre-specified "underrun" threshold level) before expiration of the specified pause time value, the receiving adapter may prompt resumption of normal full duplex transmission by sending a second MAC control frame having a pause time value of zero. Such a pause time control frame having a zero pause time value for prompting resumption of full duplex transmission is often referred to as an "XON" frame.

A problem with convention XOFF and XON Ethernet flow control relates to a lack of adaptiveness to changing traffic conditions. Specifically, convention 802.3x pause time values are statically set typically by the host device driver programmer in accordance with host processing speed. The XOFF pause time value is typically conservatively set to a higher-than-optimal value given the priority that must be given to preventing overrun conditions in the receive FIFO queue. The conservatively set pause time value results in wasted link bandwidth.

From the foregoing, it can be appreciated that a need exists for an improved Ethernet flow control technique whereby the pause time value of XOFF frames and issuance of XON frames are cooperatively determined in accordance with changing traffic conditions. The present invention addresses this and other needs unresolved by the prior art.

SUMMARY OF THE INVENTION

A method, system, and computer program product for controlling data packet traffic flow into a link partner device such as an ethernet adapter are disclosed herein. In one embodiment, an occupancy level of an adapter receive queue or buffer is monitored to detect a receive queue overrun or underrun condition or event. The detected overrun or underrun condition or event is utilized as the criteria for adjusting a pause time value within a pause time flow control frame. The pause time flow control frame is transmitted from the link partner device to a corresponding remote link partner device to pause data packet transmission in accordance with the adjusted pause time value.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

The present invention is generally directed to a method, system and computer program product for adjusting pause frame control data to improve bandwidth utilization and prevent data loss in a packet-switched network between link partners. As utilized herein, "link partners" generically refers to network endstations such as workstations or computers, or intermediate nodes such as switches, that observe and employ pause time flow control techniques such as that set forth in the IEEE 802.3x Ethernet standard. It should be noted that while the embodiments expressly depicted in the figures relate specifically to a computer host system having an Ethernet adapter configuration, the present invention is not so limited, and may be implemented in other link partner forums such as an Ethernet switch.

The invention enables dynamic adjustment of the pause time value encoded in a given pause time flow control packet, referred to herein generically as an XOFF frame. The pause time value, alternately depicted and referred to herein as a $T_{XOFF}$ value, may be increased, decreased, or left unchanged depending on the current and recent past traffic conditions as reflected by detected overrun or underrun conditions and/or trends. The detected overrun and underrun conditions are preferably detected as relative occupancy levels within a receive queue in the network adapter or other Ethernet link partner such as a switch that employs pause-type flow control.

In one embodiment, the invention is directed to an Ethernet-compatible method and system in which monitoring circuitry and/or program modules are utilized to track a flow control event, such as overrun and underrun events, and set or reset the $T_{XOFF}$ value accordingly. More specifically, the $T_{XOFF}$ value is incremented by one or more pause time units responsive to a detected overrun event such that the pause time duration is dynamically adjusted upwardly responsive to increases in incoming adapter data traffic. The present invention further provides a mechanism for decrementing $T_{XOFF}$. Namely, an underrun XOFF adjust feature includes monitoring circuitry and/or program modules for detecting and responding to an underrun condition in which the network adapter receive queue falls to or below a specified non-zero threshold. In response to a detected underrun condition in the adapter receive queue, the underrun XOFF adjust feature determines whether or not the underrun condition was preceded by an overrun condition and if so refrains from decrementing the $T_{XOFF}$ value. If the presently detected underrun condition was not preceded (immediately or within a specified time interval) by an overrun event, a further determination is made of whether the number of detected underrun events exceeds a specified threshold, and if so, the $T_{XOFF}$ value is decremented.

Figures 1, 2:
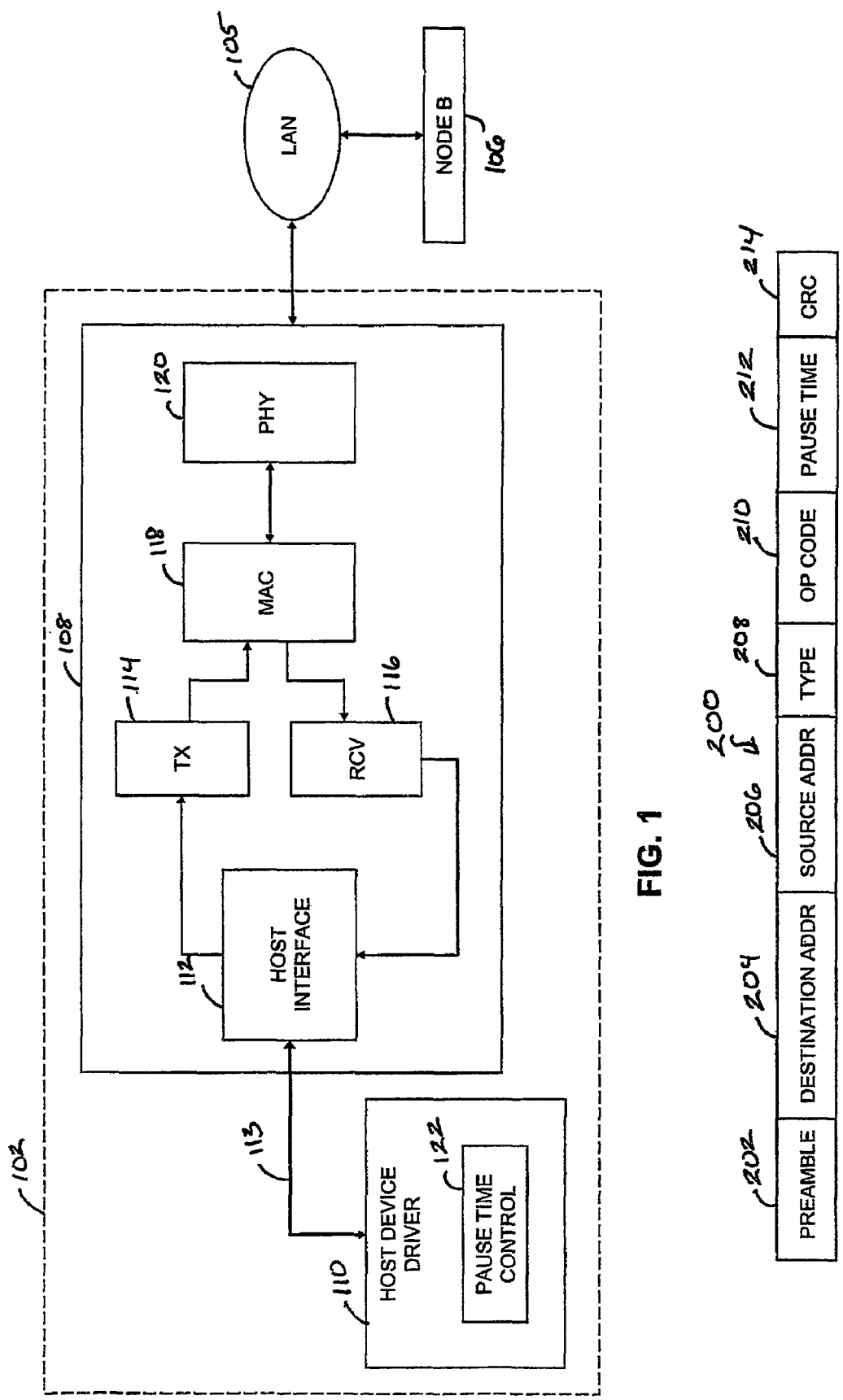
FIG. 1 is a high-level block diagram illustrating an exemplary network device implementing a pause time control adjustment feature in accordance with the present invention.
FIG. 2 depicts a block diagram representation of an exemplary MAC pause frame generated and transmitted by the network device shown in FIG. 1.

With reference now to the figures, wherein like reference numerals refer to like and corresponding parts throughout, and in particular with reference to FIG. 1, there is depicted a high-level block diagram illustrating an exemplary network device 102 implementing dynamically adjustable pause time flow control in accordance with the present invention to prevent transient packet loss conditions while maximizing available link bandwidth. Conventional pause time flow control techniques used in Ethernet full-duplex transmissions generally employ a pre-specified pause time value (often programmed into the host device driver) that is utilized as the pause time parameter for each flow control frame delivered from a recipient station. In contrast, network device 102 includes functionality for dynamically adjusting a pause time control parameter in accordance with network traffics conditions as reflected by packet receive buffer occupancy such that flow control adjustment optimally tracks network traffic transients in a timely manner. By enabling upward adjustment of pause time values to address overrun events and providing a corresponding downward pause time adjustment mechanism that preserves priority for overrun avoidance and protects against steep intermediary traffic transients, the present invention maximizes bandwidth utilization and data throughput by transmitting fewer pause control frames or pause frames specifying shorter pause time durations than in conventional systems.

In the depicted embodiment, network device 102 is an endstation type "link partner" and may be any network endstation (e.g. workstation, computer, etc.) that implements pause time flow control such as that specified by the 802.3x standard for full-duplex ethernet. In a preferred embodiment, network device 102 is compliant with one or more Ethernet/IEEE 802.3x standards. The invention is applicable to Ethernet standards providing megabits per second (Mbps) and Gigabits per second (Gbps) transmission speeds. When operating with unshielded, twisted pair (UTP) cable as a transmission medium, these networks are commonly referred to as 10BASE-T, 100BASE-T and 1000BASE-T (or Gigabit Ethernet) networks, respectively. Pause frames (such as the pause frame 200 described with reference to FIG. 2) generated by the network device 102 may comply with any of these standards, or other existing or future communication standards utilizing pause frames.

Network device 102 is communicatively coupled to a local area network (LAN) 105 to which at least one other network device, denoted node B 106 is also coupled. The transmission media coupling devices 102 and 106 may comprise coaxial cable, unshielded or shielded twisted pair cable, or fiber optic cable. Alternatively, devices 102 and 106 may communicate via wireless interface as part of LAN 105.

As further depicted in FIG. 1, network device 102 includes an Ethernet adapter unit 108 which may be contained in a network interface card (NIC). Ethernet adapter 108 includes Ethernet media access control (MAC) unit 118 communicatively coupled to a physical layer processing unit PHY 120. PHY unit 120 may be a standard integrated circuit (IC) chip having specialized circuitry necessary to interface with the type of transmission media used by LAN 105. The physical transmission media may include fiber, unshielded twisted pair (UTP), shielded twisted pair (STP), etc. MAC unit 118 schedules and controls the access of data, including pause frames, to PHY unit 120. The circuitry within PHY unit 120 encodes and decodes data into signals that are transmitted across LAN 105, and further includes a physical connector (not expressly depicted) to the LAN transmission medium. The illustrated functionality may be located on an NIC or main circuit board in the form of one or more integrated circuits. In addition, one or more of the depicted blocks or modules constituting network device 102, may be implemented in any combination of software, firmware and/or hardware.

Ethernet adapter 108 further comprises a host interface module 112 that interfaces host communications between a host bus 113 and MAC unit 118. For example, assuming host bus 113 is a peripheral component interconnect (PCI) bus, host interface 112 would be a PCI bus interface.

The generation and transmission of pause time control frames to LAN 105 is triggered by device driver 110 upon detection of a specified flow control "event." It is understood in the art that flow control events may be detected via flow control enable signals originating from a variety of sources. Such flow control enable signals may be asserted by any of a number of modules or tasks, some of which are indicative of network congestion conditions. While not expressly depicted in FIG. 1, these modules may include, for example, configuration modules, memory index modules, mirror timer modules, etc. Processor interrupts, multitasking, and excessive network broadcasts are exemplary of flow control conditions that may necessitate transmission of pause time control frames.

The pause time adjustment feature of the present feature is primarily directed monitoring and detecting flow control events associated with receive input buffer occupancy. With continued reference to FIG. 1, adapter 108 further includes a pair of memory devices for buffering packet/frame data passing between MAC unit 118 and host interface 112. Specifically, MAC unit 118 includes associated transmit and receive random access memory (RAM) buffers 114 and 116, respectively, for buffering packet data delivered to and sent from adapter 108. A monitor function, such as may be performed by device driver 110 and/or host interface 112 monitors the occupancy state of receive buffer 116 to determine if a flow control condition remains in effect.

FIG. 2 is a diagram of the various frame fields of an exemplary pause time flow control frame (alternately referred to as a flow control packet or flow control frame) in the form of an ethernet MAC control frame 200 transmitted by the network device 102 of FIG. 1. MAC pause frame 200 is substantially compliant with Ethernet standard 802.3x and generally comprises a preamble field 202, a destination address field 204, a source address field 206, a type field 208, an opcode field 210, a pause time field 212, and a cyclic redundancy check (CRC) field 214. Central to the concept of the invention, pause time field 212 contains an adjustable value specifying the time period over which the sending node, such as node B 106, is requested to halt transmission of data to the receiving node.

Preamble field 202 contains data that specifies to the remote node that a frame is being transmitted, and may further include "start-of-frame" data that serves a synchronization function. Preamble field 202 is followed by destination address field 204 and a source address field 206 which indicate, respectively, the network addresses of the remote device and host device.

Type field 208 identifies MAC pause frame 200 as a MAC control frame in contrast to a data frame. The opcode field 210 further identifies the MAC control frame as a PAUSE frame. As previously noted, the pause time field 212 specifies the timer value for pausing transmissions from the remote node to the link partner sending MAC pause frame 200. Consistent with current Ethernet convention, the pause time value may be measured in units of "pause quanta", from a total of 512 such bit times. For example, if pause time field 212 specifies 250, the remote node receiving MAC pause frame 200 responds by halting data packet transmission for 128,000 bit times (250 multiplied by 512). An exemplary range of pause time values may be 0 to 65535 pause quanta. Thus, network device 102 may request, with one MAC pause frame 200, that transmission be inhibited for 33,553,920 bit times (33.554 ms for Gigabit Ethernet).

Finally, MAC pause frame 200 further includes CRC field 214, which is typically a bit string value generated by network device 102 and compared by the receiving remote node with a recalculated version to verify transmission integrity.

When a station, such as remote node B 106, receives a MAC control frame with the pause time field 212 and associated pause opcode, it is required to stop transmissions for a time equal to the pause time parameter specified in pause time field 212. In this manner, if network device 102 is congested as reflected by an overrun condition being detected in receive buffer RAM 116, a control frame such as MAC control frame 200 may be generated and delivered to instruct the end stations to stop transmitting data to device 102.

Figure 3:
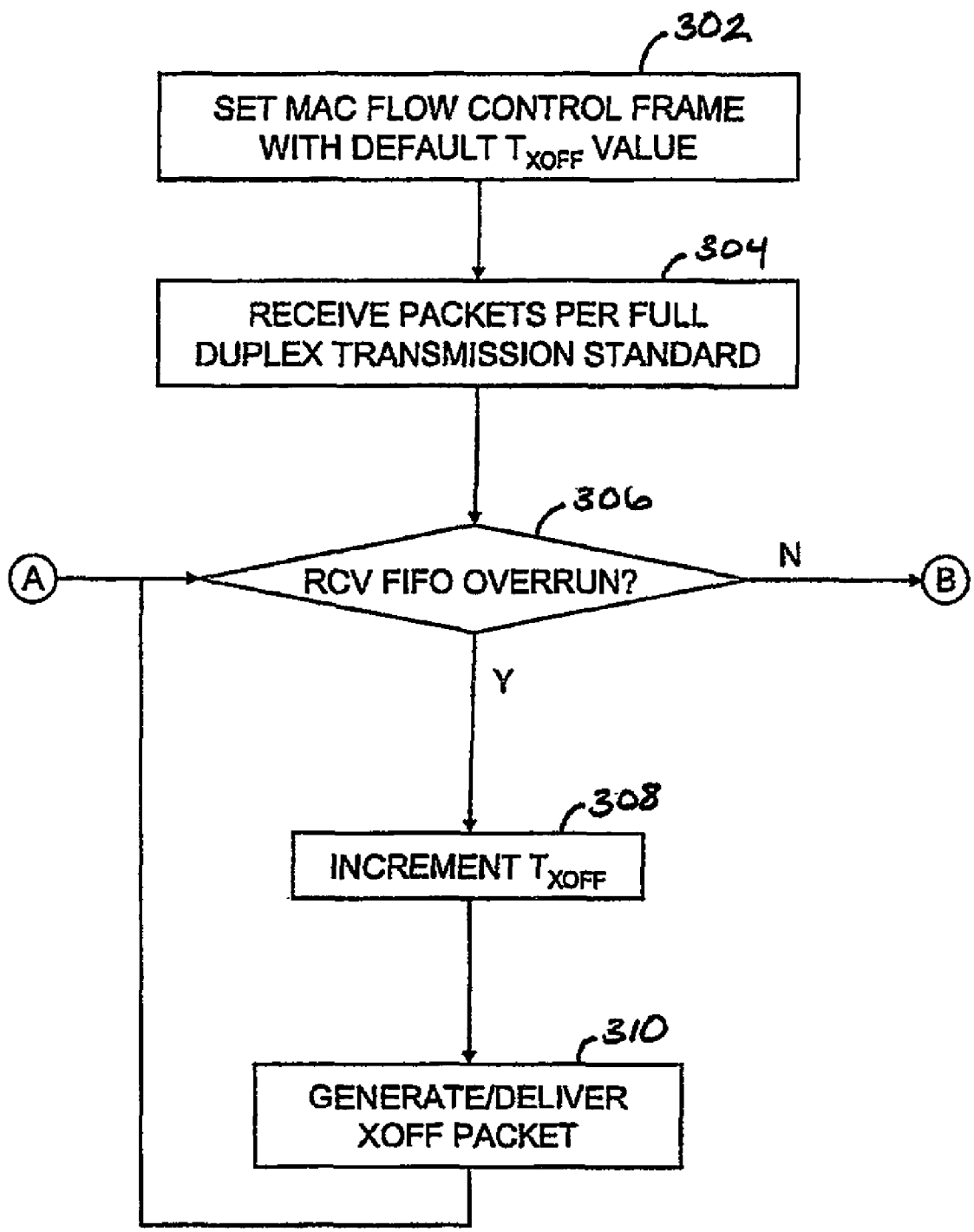
FIG. 3 is a high-level flow diagram illustrating steps performed during overrun avoidance in accordance with one embodiment of the present invention.

FIG. 3 is a high-level flow diagram illustrating steps performed during overrun avoidance in accordance with one embodiment of the present invention. The process begins as depicted at steps 302 and 304 with a pre-specified default value for $T_{XOFF}$ being used for MAC pause frames (i.e. XOFF frames) delivered by a link partner such as network device 102 following initialization and commencement of full-duplex communications. Next, as illustrated at step 306 the receive FIFO buffer (or equivalent input memory device storing incoming packet data) is monitored to detect an overrun flow condition. As utilized herein, and as is known in current implementations of 802.3x Ethernet flow control, an overrun condition does not necessarily indicate absence of any further occupancy in the receive buffer. Instead, an overrun condition may detected using reference registers such as may be deployed within the adapter to indicate when occupancy within the receive buffer has reached or exceeded a specified threshold (e.g. 85%, 92%, etc) that is less than 100%.

In response to detecting an overrun condition, pause time control module 122 increases the present $T_{XOFF}$ value by one or more temporal or transactional units as depicted at step 308. In a preferred embodiment in which network device 102 includes an Ethernet adapter 108 employing 802.3x pause time flow control, the $T_{XOFF}$ value is increased by one or more pause quanta. In an alternate embodiment, the pause value may be expressed in transactional terms directing the remote station to desist further data packet transmission until it receives one or more XON packets. In such a case, the upward adjustment depicted at step 308 may comprise specifying a higher transactional threshold condition such as wait until two XON frames received before resuming data packet transmission. The overrun avoidance process depicted in FIG. 3 concludes with an XOFF packet generated and delivered to the remote station (step 310) and the process resuming with receive FIFO overrun monitoring at step 306.

Figure 4:
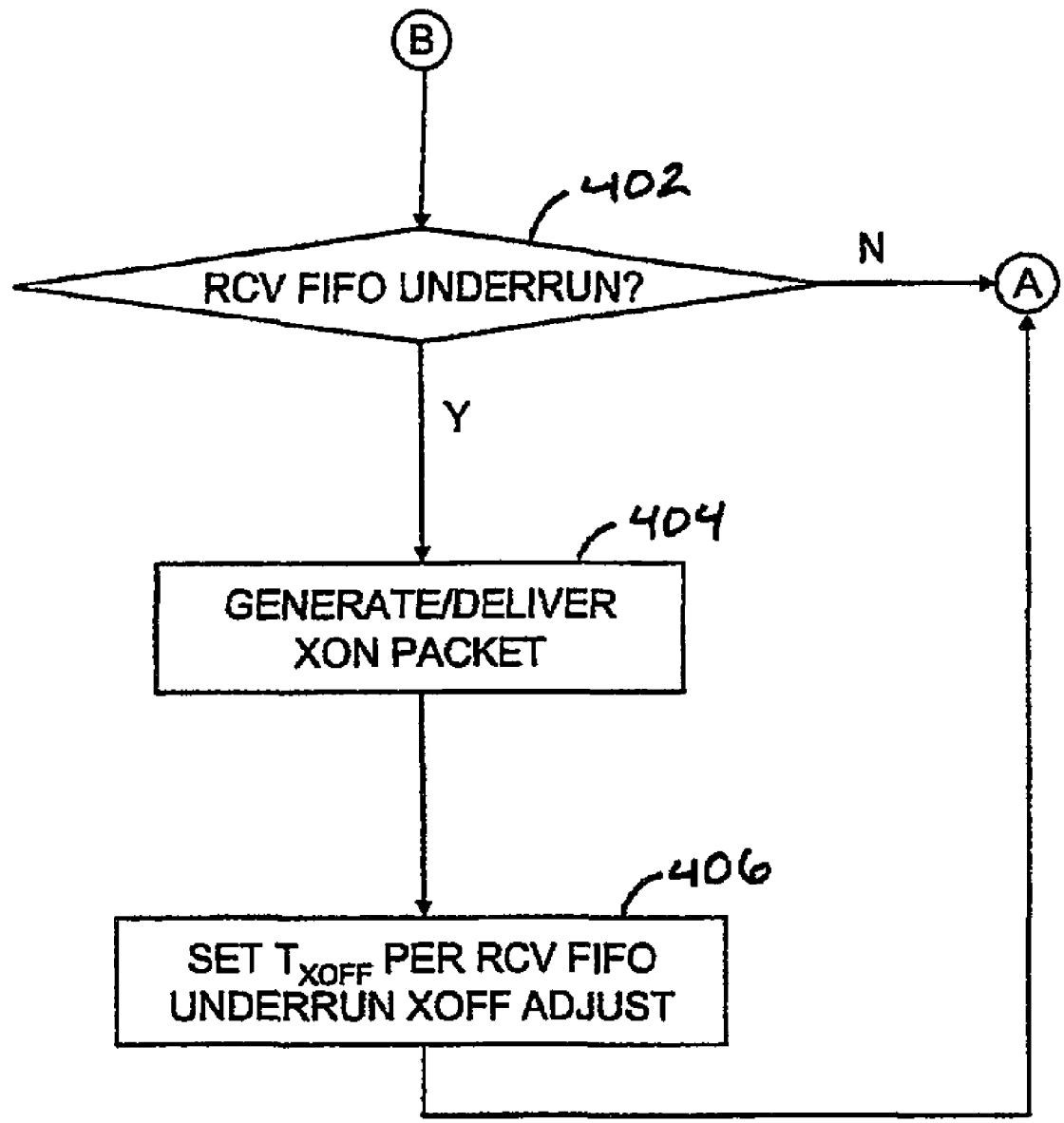
FIG. 4 is a high-level flow diagram depicting steps performed during underrun avoidance in accordance with one embodiment of the present invention.

Referring to FIG. 4, there is illustrated a high-level flow diagram depicting steps performed during underrun avoidance in accordance with one embodiment of the present invention. As shown at in FIG. 4, the process commences in relation to receive FIFO monitoring during full-duplex transmissions depicted in FIG. 3. Specifically, and as shown at step 402, pause time control module 122, as deployed from device driver 110 or from within the Ethernet adapter 108, monitors receive FIFO occupancy levels to detect underrun conditions as well as the overrun detection explained with reference to FIG. 3. Similar to the overrun definition explained with reference to FIG. 3, an "underrun" is preferably characterized/defined as a precursor to a queueing problem. Specifically, an underrun condition in the receive FIFO buffer/queue detected at step 402 does not preferably indicate a condition of zero receive FIFO occupancy. Instead, an underrun condition may be detected using reference registers such as may be deployed within the adapter to indicate when occupancy within the receive buffer has reached or dropped below a specified threshold (e.g. 15%, 8%, etc) that is greater than 0%.

In response to a detected underrun condition, a MAC pause frame having a pause time value set to zero (i.e. an XON frame) is delivered in accordance with 802.3x flow control convention (step 404). In further response to the detected underrun, and as depicted at step 406, the pause time value to be encoded in future XOFF frames (i.e. the $T_{XOFF}$ value) is set in accordance with an underrun XOFF adjust algorithm, such as that explained below with reference to FIG. 5. The setting/adjustment of the $T_{XOFF}$ value is preferably performed by pause time control module 122 as deployed from device driver 110 or from Ethernet adapter 108. As further shown in FIG. 4, receive FIFO monitoring continues following the remedial the $T_{XOFF}$ adjust steps.

Figure 5:
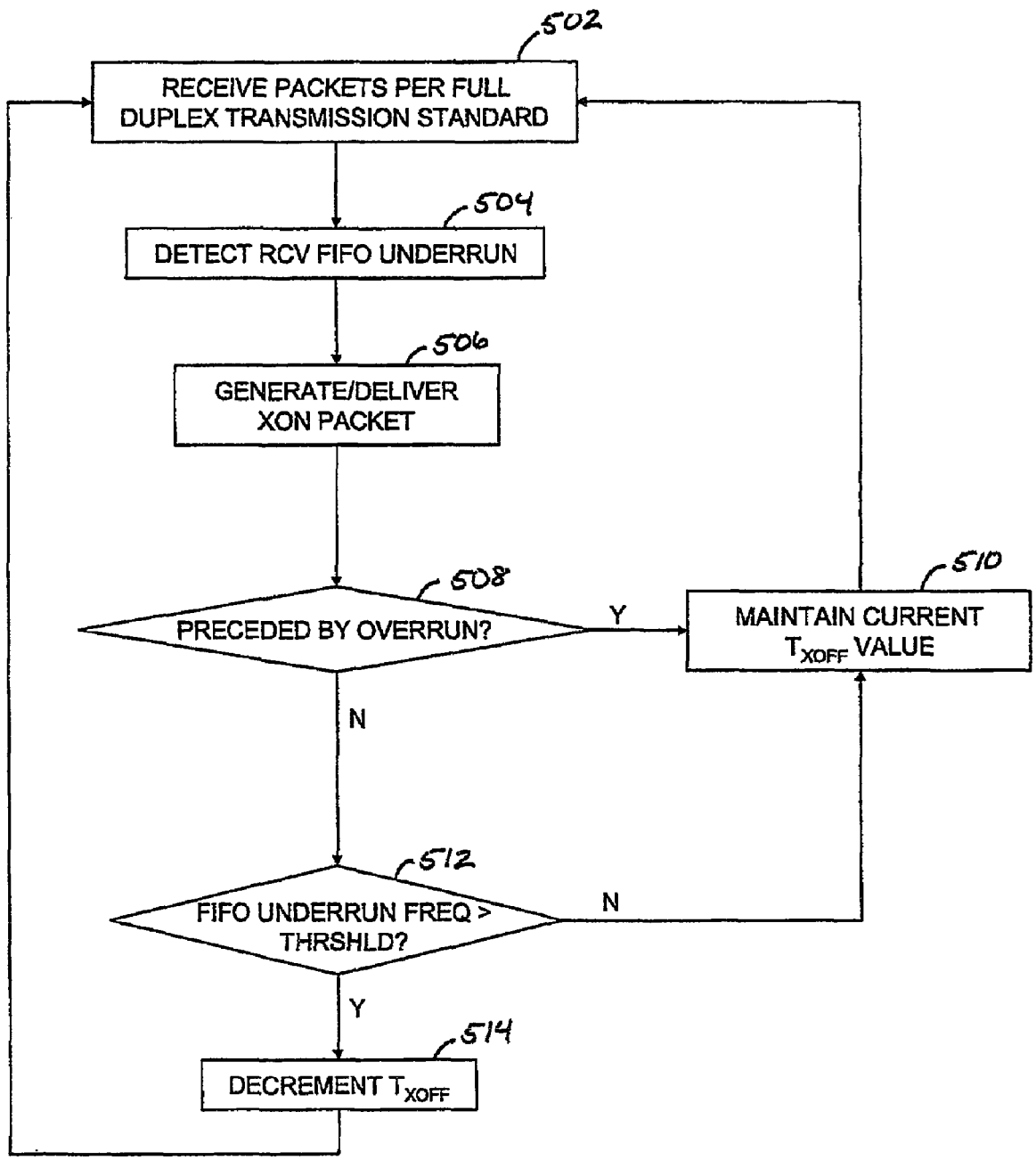
FIG. 5 is a high-level flow diagram illustrating steps performed during receive FIFO underrun XOFF adjustment in accordance with one embodiment of the present invention.

With reference to FIG. 5, there is depicted a high-level flow diagram illustrating steps performed during receive FIFO underrun XOFF adjustment in accordance with one embodiment of the present invention. The process commences as illustrated at steps 502 and 504 with a receive FIFO underrun detected during full-duplex Ethernet transmissions. Proceeding to step 506, the adapter generates and delivers an XON packet to prompt the remote station to commence or re-commence data packet transmissions. Next, as illustrated at step 508, pause time control module 122, determines whether or not the receive FIFO underrun condition detected at step 504 was immediately or otherwise proximately preceded by a detected receive FIFO overrun condition. Different criteria may be utilized to characterize the "preceding" condition. In one embodiment, for example, an overrun event "precedes" the detected underrun if the overrun occurred within a specified time interval prior to the temporal occurrence of the subsequent underrun. In an alternate embodiment, an overrun event is determined to precede the underrun in terms of MAC flow control frame chronology. That is, whether the overrun "precedes" the subsequently detected underrun is conditioned on whether intervening flow control conditions necessitating MAC flow control frame generation have been detected.

As depicted at step 510, in response to the preceding overrun condition being met, the present $T_{XOFF}$ value is maintained for the next XOFF frame transmission. If, however, the presently detected underrun was not preceded by a detected overrun condition, a further determination is made of whether or not the frequency of detected underrun events over a specified period has reached or exceeded a specified threshold level (step 512). If not, and as shown at step 510, the present $T_{XOFF}$ value is maintained for the next XOFF frame transmission. If the inquiry shown at step 512 results in a determination that presently detected underrun condition is included in a set of such underrun events detected over a specified interval resulting in an underrun frequency that exceeds the specified threshold, the present $T_{XOFF}$ value is decreased by one or more specified decrements units as shown in step 514.

While the invention will be described in the general context of an application program that runs on an operating system in conjunction with a personal computer, those skilled in the art will recognize that the invention may also be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like.

While the invention has been particularly shown and described with reference to a preferred embodiment, it will be understood by those skilled in the art that various changes in form and detail may be made therein without departing from the spirit and scope of the invention. These alternate implementations all fall within the scope of the invention.

What is claimed is:

1. A method for controlling data packet traffic flow into a link partner device, said method comprising:
    detecting an occupancy level of a receive queue in the link partner device, wherein said detecting an occupancy level of a receive queue in the link partner device comprises detecting a receive queue overrun condition;
    setting a pause time value within a flow control frame in accordance with said detected occupancy level of the receive queue, wherein the pause time value is an adjustable value that is increased, decreased, or left unchanged after the occupancy level is detected and based on the detected occupancy level of the receive queue;
    wherein the pause time value is expressed in transactional terms, which directs the link partner device to desist further data packet transmission until the link partner device receives one or more XON packets;
    performing an upward adjustment of the pause time value by specifying a higher transactional threshold condition of waiting until two XON frames are received, instead of one XON frame, before resuming data packet transmission; and
    transmitting the flow control frame from the link partner device to a corresponding remote link partner device.

2. The method of claim 1, wherein:
    the link partner device is an Ethernet adapter or a network switch; and
    said detecting an occupancy level of a receive queue in the link partner device is preceded by setting the pause time value to a default value.

3. The method of claim 1, said detecting a receive queue overrun condition comprising detecting that the occupancy level of the receive queue has exceeded a pre-specified level below a 100% occupancy level.

4. The method of claim 1, said setting a pause time value within a flow control frame in accordance with said detected occupancy level of the receive queue comprising incrementing the pause time value by one or more specified pause time increments.

5. The method of claim 1, wherein said detecting an occupancy level of a receive queue in the link partner device comprises detecting a receive queue underrun condition.

6. The method of claim 5, said detecting a receive queue underrun condition comprising detecting that the occupancy level of the receive queue has fallen below a pre-specified level above a 0% occupancy level.

7. The method of claim 5, further comprising, responsive to detecting a receive queue underrun condition, delivering an XON flow control packet from said link partner device.

8. The method of claim 5, said setting a pause time value within a flow control frame in accordance with said detected occupancy level of the receive queue comprising setting the pause time value in accordance with an underrun-specified XOFF adjust condition.

9. A method for controlling data packet traffic flow into a link partner device, said method comprising:
  detecting an occupancy level of a receive queue in the link partner device;
  setting a pause time value within a flow control frame in accordance with said detected occupancy level of the receive queue; and
  transmitting the flow control frame from the link partner device to a corresponding remote link partner device;
  wherein said setting the pause time value is provided in accordance with an underrun-specified XOFF adjust condition and comprises setting the pause time value in accordance with whether or not a last detected underrun condition was preceded by an overrun condition in the receive queue.

10. The method of claim 9, further comprising, responsive to a last detected underrun condition being preceded by an overrun condition in the receive queue, maintaining the current pause time value in said flow control frame.

11. The method of claim 9, further comprising, responsive to a last detected underrun condition not being preceded by an overrun condition in the receive queue, determining whether or not the detected underrun frequency in the receive queue exceeds a specified threshold.

12. The method of claim 11, further comprising, responsive to the detected underrun frequency in the receive queue exceeding a specified threshold, decrementing the pause time value by one or more specified pause time increments.

13. A computer program product for controlling data packet traffic flow into a link partner device, said computer program product comprising a computer readable storage/memory device on which is stored computer-executable instructions for performing a method comprising:
  detecting an occupancy level of a receive queue in the link partner device, wherein said detecting an occupancy level of a receive queue in the link partner device comprises detecting a receive queue overrun condition;
  setting a pause time value within a flow control frame in accordance with said detected occupancy level of the receive queue, wherein the pause time value is an adjustable value that is increased, decreased, or left unchanged after the occupancy level is detected and based on the detected occupancy level of the receive queue;
  wherein the pause time value is expressed in transactional terms, which directs the link partner device to desist further data packet transmission until the link partner device receives one or more XON packets;
  performing an upward adjustment of the pause time value by specifying a higher transactional threshold condition of waiting until two XON frames are received, instead of one XON frame, before resuming data packet transmission; and
  transmitting the flow control frame from the link partner device to a corresponding remote link partner device.

14. The computer program product of claim 13, wherein said detecting an occupancy level of a receive queue in the link partner device is preceded by setting the pause time value to a default value.

15. The computer program product of claim 13, said detecting an occupancy level of a receive queue in the link partner device comprising detecting a receive queue overrun condition, wherein said detecting a receive queue overrun condition comprising detecting that the occupancy level of the receive queue has exceeded a pre-specified level below a 100% occupancy level.

16. The computer program product of claim 15, said setting a pause time value within a flow control frame in accordance with said detected occupancy level of the receive queue comprising incrementing the pause time value by one or more specified pause time increments.

17. The computer program product of claim 13, said detecting an occupancy level of a receive queue in the link partner device comprising detecting a receive queue underrun condition, wherein said detecting a receive queue underrun condition comprising detecting that the occupancy level of the receive queue has fallen below a pre-specified level above a 0% occupancy level.

18. The computer program product of claim 17, further comprising, responsive to detecting a receive queue underrun condition, delivering an XON flow control packet from said link partner device.

19. The computer program product of claim 17, said setting a pause time value within a flow control frame in accordance with said detected occupancy level of the receive queue comprising setting the pause time value in accordance with an underrun-specified XOFF adjust condition.

20. A computer program product for controlling data packet traffic flow into a link partner device, said computer program product comprising a computer readable storage/memory device on which is stored computer-executable instructions for performing a method comprising:
  detecting an occupancy level of a receive queue in the link partner device;
  setting a pause time value within a flow control frame in accordance with said detected occupancy level of the receive queue, wherein the pause time value is an adjustable value that is increased, decreased, or left unchanged based on the detected occupancy level of the receive queue; and
  transmitting the flow control frame from the link partner device to a corresponding remote link partner device;
  wherein said setting the pause time value is provided in accordance with an underrun-specified XOFF adjust condition and comprises setting the pause time value in accordance with whether or not a last detected underrun condition was preceded by an overrun condition in the receive queue.

21. The computer program product of claim 20, further comprising, responsive to a last detected underrun condition being preceded by an overrun condition in the receive queue, maintaining the current pause time value in said flow control frame.

22. The computer program product of claim 20, further comprising, responsive to a last detected underrun condition not being preceded by an overrun condition in the receive queue, determining whether or not the detected underrun frequency in the receive queue exceeds a specified threshold.

23. The computer program product of claim 22, further comprising, responsive to the detected underrun frequency in the receive queue exceeding a specified threshold, decrementing the pause time value by one or more specified pause time increments.

24. A system for controlling data packet traffic flow into a link partner device, said system comprising a network device having a network adapter unit with a device driver performing the functions of:
  detecting an occupancy level of a receive queue in the link partner device, wherein said detecting an occupancy level of a receive queue in the link partner device comprises detecting a receive queue overrun condition;

setting a pause time value within a flow control frame in accordance with said detected occupancy level of the receive queue, wherein the pause time value is an adjustable value that is increased, decreased, or left unchanged after the occupancy level is detected and based on the detected occupancy level of the receive queue;

wherein the pause time value is expressed in transactional terms, which directs the link partner device to desist further data packet transmission until the link partner device receives one or more XON packets;

performing an upward adjustment of the pause time value by specifying a higher transactional threshold condition of waiting until two XON frames are received, instead of one XON frame, before resuming data packet transmission; and transmitting the flow control frame from the link partner device to a corresponding remote link partner device.

25. The system of claim 24, wherein the link partner device is an Ethernet adapter or a network switch.

26. The system of claim 24, said detecting an occupancy level of a receive queue in the link partner device comprising detecting a receive queue overrun condition.

27. The system of claim 26, said detecting a receive queue overrun condition comprising detecting that the occupancy level of the receive queue has exceeded a pre-specified level below a 100% occupancy level.

28. The system of claim 27, said setting a pause time value within a flow control frame in accordance with said detected occupancy level of the receive queue comprising incrementing the pause time value by one or more specified pause time increments.

29. The system of claim 24, said detecting an occupancy level of a receive queue in the link partner device comprising detecting a receive queue underrun condition.

30. The system of claim 29, said detecting a receive queue underrun condition comprising detecting that the occupancy level of the receive queue has fallen below a pre-specified level above a 0% occupancy level.

31. The system of claim 29, further comprising, responsive to detecting a receive queue underrun condition, delivering an XON flow control packet from said link partner device.

32. The system of claim 29, said setting a pause time value within a flow control frame in accordance with said detected occupancy level of the receive queue comprising setting the pause time value in accordance with an underrun-specified XOFF adjust condition.

33. A system for controlling data packet traffic flow into a link partner device, said system comprising a network device having a network adapter unit with a device driver performing the functions of:

detecting an occupancy level of a receive queue in the link partner device;

setting a pause time value within a flow control frame in accordance with said detected occupancy level of the receive queue, wherein the pause time value is an adjustable value that is increased, decreased, or left unchanged based on the detected occupancy level of the receive queue; and transmitting the flow control frame from the link partner device to a corresponding remote link partner device;

wherein said setting the pause time value is provided in accordance with an underrun-specified XOFF adjust condition and comprises setting the pause time value in accordance with whether or not a last detected underrun condition was preceded by an overrun condition in the receive queue.

34. The system of claim 33, further comprising, responsive to a last detected underrun condition being preceded by an overrun condition in the receive queue, maintaining the current pause time value in said flow control frame.

35. The system of claim 33, further comprising, responsive to a last detected underrun condition not being preceded by an overrun condition in the receive queue, determining whether or not the detected underrun frequency in the receive queue exceeds a specified threshold.

36. The system of claim 35, further comprising, responsive to the detected underrun frequency in the receive queue exceeding a specified threshold, decrementing the pause time value by one or more specified pause time increments.

37. The method of claim 8, wherein when a presently detected underrun was not preceded by a detected overrun condition, the method further comprises:

determining whether a frequency of detected underrun events over a specified period has reached or exceeded a specified threshold level;

when the frequency of detected underrun events over a specified period has not reached or exceeded the specified threshold level, maintaining a present $T_{XOFF}$ value for a next XOFF frame transmission; and when the frequency of detected underrun events over a specified period has reached or exceeded a specified threshold level:

determining whether a presently detected underrun condition is included in a set of underrun events detected over a specified interval which results in an underrun frequency that exceeds a specified threshold; and decreasing the present $T_{XOFF}$ value by one or more specified decrements units when the presently detected underrun condition is included in a set of underrun events detected over a specified interval which results in an underrun frequency that exceeds a specified threshold.

* * * * *